US012020626B2

(12) United States Patent
Lim et al.

(10) Patent No.: US 12,020,626 B2
(45) Date of Patent: Jun. 25, 2024

(54) DISPLAY APPARATUS AND CONTROL METHOD THEREOF

(71) Applicant: SAMSUNG ELECTRONICS CO., LTD., Suwon-si (KR)

(72) Inventors: Sungjin Lim, Suwon-si (KR); Minhong Park, Suwon-si (KR); Jihye Kim, Suwon-si (KR); Kyeongjin Lee, Suwon-si (KR); Dongki Lee, Suwon-si (KR); Youngho Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/139,769

(22) Filed: Apr. 26, 2023

(65) Prior Publication Data

US 2023/0260447 A1 Aug. 17, 2023

Related U.S. Application Data

(63) Continuation of application No. PCT/KR2021/015234, filed on Oct. 27, 2021.

(30) Foreign Application Priority Data

Nov. 30, 2020 (KR) ........................ 10-2020-0164682

(51) Int. Cl.
*G09G 3/20* (2006.01)

(52) U.S. Cl.
CPC ... *G09G 3/2092* (2013.01); *G09G 2310/0245* (2013.01); *G09G 2310/0267* (2013.01); *G09G 2310/0275* (2013.01); *G09G 2354/00* (2013.01)

(58) Field of Classification Search
CPC ..... G09G 2310/027; G09G 2320/0233; G09G 3/3233
See application file for complete search history.

(56) References Cited

U.S. PATENT DOCUMENTS 7,190,338 B2 3/2007 Kubota et al.
7,522,160 B2 4/2009 Moon
(Continued)

FOREIGN PATENT DOCUMENTS

JP 2007-114785 A 5/2007
JP 2008-304578 A 12/2008
(Continued)

OTHER PUBLICATIONS

International Search Report (PCT/ISA/210) issued by the International Searching Authority on Jan. 25, 2022 in International Patent Application No. PCT/KR2021/015234.
(Continued)

*Primary Examiner* — Nelson M Rosario
*Assistant Examiner* — Scott D Au
(74) *Attorney, Agent, or Firm* — Sughrue Mion, PLLC

(57) ABSTRACT

A display apparatus includes a panel driver; a display panel including a plurality of pixels connected to a plurality of gate lines and a plurality of data lines through a plurality of switching elements; and a processor configured to control the panel driver to output a gate signal through the plurality of gate lines, and display an image in the display panel by controlling the panel driver to apply, through the plurality of data lines, data voltage to pixels, from among the plurality of pixels, connected with switching elements, from among the plurality of switching elements, to which the gate signal is output, wherein the processor is further configured to control, based on a user input for selecting a ratio of the image, the panel driver to output the gate signal to at least one first gate line connected with a first subset of pixels, from among the plurality of pixels, for displaying the image according to the user input.

14 Claims, 7 Drawing Sheets

(56) References Cited

U.S. PATENT DOCUMENTS

| | | | | |
|---|---|---|---|---|
| 9,520,075 | B2 | 12/2016 | Cho et al. | |
| 2006/0061540 | A1 * | 3/2006 | Harada ................ | G09G 3/3677 345/103 |
| 2007/0085766 | A1 | 4/2007 | Yoo | |

FOREIGN PATENT DOCUMENTS

| | | | |
|---|---|---|---|
| JP | 5259911 | B2 | 8/2013 |
| KR | 10-0509257 | B1 | 8/2005 |
| KR | 10-0607264 | B1 | 7/2006 |
| KR | 10-0739565 | B1 | 7/2007 |
| KR | 10-2009-0057567 | A | 6/2009 |
| KR | 10-1101439 | B1 | 1/2012 |
| KR | 10-2014-0116607 | A | 10/2014 |
| KR | 10-2016-0018959 | A | 2/2016 |
| KR | 10-2016-0150183 | A | 12/2016 |
| KR | 10-2019-0076177 | A | 7/2019 |

OTHER PUBLICATIONS

Written Opinion (PCT/ISA/237) issued by the International Searching Authority on Jan. 25, 2022 in International Patent Application No. PCT/KR2021/015234.

* cited by examiner

DISPLAY APPARATUS AND CONTROL METHOD THEREOF

CROSS-REFERENCE TO RELATED APPLICATIONS

This application is a bypass continuation application of International Application No. PCT/KR2021/015234, filed on Oct. 27, 2021, which is based on and claims priority to Korean Patent Application No. 10-2020-0164682, filed on Nov. 30, 2020, in the Korean Intellectual Property Office, the disclosures of which are incorporated by reference herein in their entireties.

BACKGROUND

1. Field

The disclosure relates to a display apparatus and a control method thereof. More particularly, the disclosure relates to a display apparatus that can display an image through a high-speed driving and a control method thereof.

2. Description of Related Art

With developments in electronic technology, images with a high frame rate (HFR) are being provided. Images as described above may be played back seamlessly by a display apparatus which can process image data in frequencies such as 144 Hz or 240 Hz, that is, perform high-speed driving.

In particular, recently, high frame rate images (e.g., game-related images or sports-related images) that provide a sense of immersion through screens in which an aspect ratio is 32:9 or 21:9, or the like are being provided.

However, display apparatuses of the related art merely process image data according to a preset driving frequency, or a frequency that is lower than the preset driving frequency, and display apparatuses have a problem of not being able to operate at a driving frequency of greater than or equal to 120 Hz when a driving frequency of, for example, 60 Hz is set.

The above causes a problem of generating an interruption phenomenon when playing back a game-related image or a sports-related image having a high frame rate (or, having a high number of frames per second) and thereby causing a user to not be able to smoothly enjoy the image.

SUMMARY

Provided are a display apparatus that can smoothly play back even an image of a high frame rate seamlessly through high-speed driving and a control method thereof.

According to an aspect of the disclosure, a display apparatus includes: a panel driver; a display panel including a plurality of pixels connected to a plurality of gate lines and a plurality of data lines through a plurality of switching elements; and a processor configured to control the panel driver to output a gate signal through the plurality of gate lines, and display an image in the display panel by controlling the panel driver to apply, through the plurality of data lines, data voltage to pixels, from among the plurality of pixels, connected with switching elements, from among the plurality of switching elements, to which the gate signal is output, wherein the processor is further configured to control, based on a user input for selecting a ratio of the image, the panel driver to output the gate signal to at least one first gate line connected with a first subset of pixels, from among the plurality of pixels, for displaying the image according to the user input.

The panel driver may be further configured to not output the gate signal to at least one second gate line connected with a second subset of pixels from among the plurality of pixels excluding the first subset of pixels.

The panel driver may include a plurality of driving circuits, each of the plurality of driving circuits being connected with at least one gate line from among the plurality of gate lines, and configured to output, based on the user input, the gate signal to the at least one gate line through at least a first subset of circuits from among the plurality of driving circuits.

The processor may be further configured to transmit a scan start signal for driving the first subset of circuits and a low signal for not driving a second subset of circuits from among the plurality of driving circuits, excluding the first subset of circuits, to the panel driver.

The panel driver may be further configured to apply, based on an output timing of the gate signal, data voltage to each pixel connected to each gate line to which the gate signal is output.

The processor may be further configured to: control, based on the user input selecting a full-screen ratio, the panel driver to output the gate signal through the plurality of gate lines, and control, based on the user input selecting a partial-screen ratio, the panel driver to output the gate signal through the at least one first gate line.

The processor may be further configured to: control the panel driver to output the gate signal to at least one second gate line connected with a second subset of pixels from among the plurality of pixels, excluding the first subset of pixels, at a preset period, and control, based on a timing at which the gate signal is output at the preset period, the panel driver to apply data voltage for displaying an image of a substantially black color to the second subset of pixels.

The processor may be further configured to determine, based on a user input for controlling a movement of the image, the first subset of pixels and the at least one first gate line.

According to an aspect of the disclosure, a control method of a display apparatus, includes: outputting a gate signal through a plurality of gate lines of the display apparatus; and applying, through a plurality of data lines, data voltage to pixels, from among a plurality of pixels of the display apparatus, connected with switching elements, from among a plurality of switching elements of the display apparatus, to which the gate signal is output, wherein the outputting the gate signal includes: outputting, based on a user input for selecting a ratio of an image, the gate signal to at least one first gate line connected with a first subset of pixels from among the plurality of pixels for displaying the image according to the user input, and not outputting the gate signal to at least one second gate line connected with a second subset of pixels from among the plurality of pixels excluding the first subset of pixels.

The outputting the gate signal may include outputting, based on the user input, the gate signal to the at least one first gate line through at least a first subset of circuits from among a plurality of driving circuits.

The outputting the gate signal may include outputting, based on a scan start signal for driving the first subset of circuits and a low signal for not driving a second subset of circuits from among the plurality of driving circuits, excluding the first subset of circuits, the gate signal, to the at least one first gate line.

The applying the data voltage may include applying, based on an output timing of the gate signal, data voltage to each pixel connected with each gate line to which the gate signal is output.

The outputting the gate signal may include: outputting, based on the user input for selecting a full-screen ratio, the gate signal through each of the plurality of gate lines, and selectively outputting, based on the user input selecting a partial-screen ratio, the gate signal to the at least one first gate line.

The control method may further include: outputting the gate signal to the at least one second gate line at a preset period; and applying, based on a timing at which the gate signal is output at the preset period, data voltage for displaying an image of a substantially black color to the second subset of pixels.

The control method may further include determining, based on a movement user input for controlling a movement of the image, the first subset of pixels and the at least one first gate line.

According to various embodiments of the disclosure as described above, a display apparatus that can smoothly play back even an image of a high frame seamlessly and a control method thereof may be provided. Specifically, according to various embodiments of the disclosure, a high frame rate image may be smoothly played back to provide a sense of immersion seamlessly through a screen in which an aspect ratio is 32:9 or 21:9.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

First, terms used in describing the various embodiments of the disclosure are general terms selected considering their function herein. However, the terms may change depending on intention, legal or technical interpretation, emergence of new technologies, and the like of those skilled in the related art. Further, in certain cases, there may be terms arbitrarily selected. In such case, the meaning of the term may be interpreted as defined in the description, and if there is no specific definition of the term, the meaning of the term may be interpreted based on the overall context of the disclosure and the technical common sense according to the related art.

Further, where providing a detailed description of related known technologies may unnecessarily confuse the gist of the disclosure, the detailed description thereof will be omitted.

Furthermore, although the embodiments of the disclosure have been described in detail below with reference to the accompanying drawings and the descriptions of the accompanying drawings, the disclosure is not limited to the illustrated embodiments.

The disclosure will be described in detail below with reference to the accompanying drawings.

Figure 1:
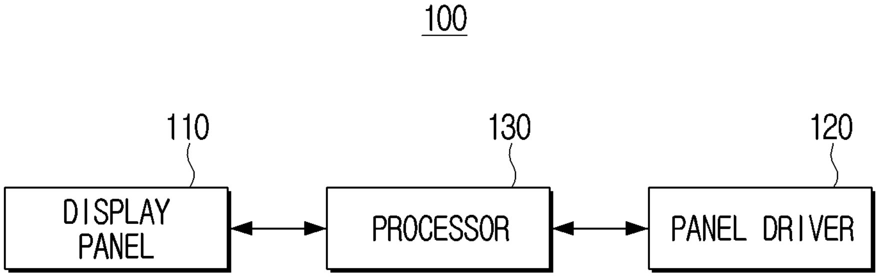
FIG. 1 is a block diagram illustrating a display apparatus according to an embodiment of the disclosure.
Figure 2:
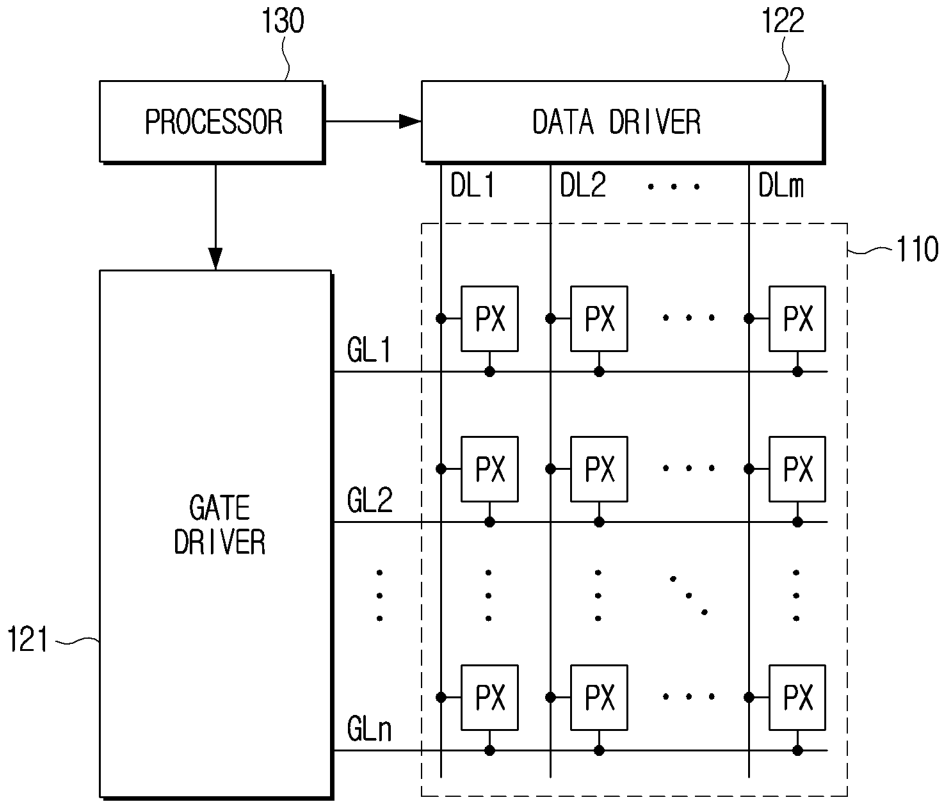
FIG. 2 is a diagram illustrating a driving of a display apparatus according to an embodiment of the disclosure.

FIG. 1 is a block diagram illustrating a display apparatus according to an embodiment of the disclosure, and FIG. 2 is a diagram illustrating a driving of a display apparatus according to an embodiment of the disclosure.

A display apparatus 100 according to an embodiment of the disclosure may be a variety of electronic devices that include a display such as a television (TV), a monitor, a notebook computer, a tablet, a personal digital assistant (PDA), a smart phone, and the like.

Referring to FIG. 1, the display apparatus 100 according to an embodiment of the disclosure may include a display panel 110, a panel driver 120, and a processor 130.

The display panel 110 may display various images. In an example, the display panel 110 may display either of a pre-stored image and an image received from an external device. Here, the external device may be various electronic devices capable of transmitting an image to a display apparatus 100 such as a server, a computer, a notebook computer, a smart phone, and the like.

An image may be a concept which includes at least one from among a still image or a moving image, and the display panel 110 may display various images such as a broadcast content or a multimedia content. In addition, the display panel 110 may also display various user interfaces (UIs) and icons.

Specifically, the display panel 110 may display, in an example, an image having a high frame rate (HFR) by the panel driver 120 that operates at a driving frequency of 144 Hz or 240 Hz. Here, the HFR image may be an image in which a number of frames per second is, for example, at least 144 frames, and as an example, may be a game-related image, a sports-related image, or the like, but is not necessarily limited thereto.

As described above, the display panel 110 may be implemented as a display of a liquid crystal display (LCD) form. However, according to an embodiment, the display panel 110 may be implemented as a display of various forms such as a light emitting diode (LED), Organic Light Emitting Diodes (OLEDs), a Liquid Crystal on Silicon (LCoS), a Digital Light Processing (DLP), and the like. In addition, in the display panel 110, a driving circuit, which may be implemented in the form of an amorphous silicon (a-Si) thin-film transistor (TFT), a low temperature poly silicon (LTPS) TFT, an organic TFT (OTFT), or the like, a backlight unit, and the like may be included together therewith.

In addition, the display panel 110 may be coupled with a touch sensing unit and implemented with a touch screen.

The display panel 110 may include a plurality of pixels connected with a plurality of gate lines and a plurality of data lines through a plurality of switching elements.

The panel driver 120 may display an image through the plurality of pixels included in the display panel 110.

Referring to FIG. 2, the panel driver 120 may include a gate driver 121 that connects with a switching element included in each pixel (PX) through the plurality of gate lines GL1, GL2, . . . , GLn, and a data driver 122 that connects with the switching element included in each pixel (PX) through the plurality of data lines DL1, DL2, . . . , DLm.

Here, the pixel may include the switching element, a pixel electrode connected to the switching element, and a common electrode.

The switching element may, for example, be a thin film transistor (TFT).

The switching element may be turned-on by a gate signal (for example, a "high" gate signal) that is output through a gate line. In this case, the plurality of data lines connected to the data driver 122 may be electrically connected with a plurality of turned-on switches, and the data driver 122 may apply (or, charge) data voltage to the pixel electrode (e.g., capacitor) included in each pixel through the plurality of data lines. To this end, a first terminal of the switching element may be connected with the gate line, and a second terminal may be connected with the data line.

The switching element may be turned-off when a "low" gate signal is output through the gate line, and in this case, data voltage charged in the pixel electrode may be maintained for a certain time.

The gate driver 121 may receive a gate driving control signal from the processor 130. Here, the gate driving control signal may include a scan start signal that includes information on a start of a scan and a clock control signal for controlling an output time of the gate signal.

Then, the gate driver 121 may adjust an output timing of the gate signal according to the scan start signal. Here, the gate signal may be, for example, a pulse signal, and may be sequentially output to the switching element included in each pixel (PX) through the gate line.

In this case, the switching element may be turned-on by the gate signal that is output through the gate line, and the data line and the pixel electrode may be electrically connected.

Specifically, the gate driver 121 may output, based on the scan start signal, the gate signal through some but not all gate lines from among the plurality of gate lines. Here, the scan start signal may be generated based on a user input for selecting an image ratio, which may be termed a ratio user input. Specifically, the scan start signal may be a signal for transmitting the gate signal to some but not all pixels from among the plurality of pixels included in the display panel 110, for displaying an image according to the user input for selecting the image ratio.

In an example, if an aspect ratio of the display is 16:9, and an image ratio selected according to the user input is 32:9 or 21:9, the processor 130 may transmit the scan start signal for displaying an image according to the image ratio selected based on the user input to the gate driver 121.

In this case, the gate driver 121 may selectively output the gate signal through some gate lines that are connected with the pixels for displaying the image based on the scan start signal, and selectively not output the gate signal through remaining gate lines.

Herein, the "some" gate lines may also be termed first gate lines, and may also be termed gate lines of a first gate line subset of the plurality of gate lines, while the remaining gate lines may also be termed second gate lines, and may also be termed gate lines of a second gate line subset of the plurality of gate lines which excludes the first gate line subset. Likewise, the "some" pixels may also be termed first pixels, and may also be termed pixels of a first pixel subset of the plurality of pixels, while the remaining pixels may also be termed second pixels, and may also be termed pixels of a second pixel subset of the plurality of pixels which excludes the first pixel subset. That is, the first gate lines are connected with the first pixels, and the second gate lines are connected with the second pixels. It is noted that the specific pixels which are first or second pixels, and thereby the specific gate lines which are first or second gate lines, need not be constant upon determination but may be altered or re-determined by user preference or other configuration, as will be seen further herein.

As described above, by not transmitting the gate signal through the remaining gate lines excluding the some gate lines based on the user input for selecting the image ratio, the display panel 110 may be driven at a fast frequency which is compensated for by a time in which the gate signal is not transmitted.

The data driver 122 may receive a data driving control signal and a digital image signal from the processor 130. Here, the digital image signal may include information on a plurality of grayscale values corresponding to a plurality of pixels that are positioned on at least one row (or, horizontal line) from among the plurality of pixels.

Then, the data driver 122 may obtain data voltage (or, grayscale voltage) corresponding to the digital image signal based on information on the plurality of grayscale values included in the digital image signal. Then, the data driver 122 may apply, based on the data driving control signal, the data voltage to a plurality of pixel electrodes included in the plurality of pixels through the plurality of data lines.

Here, the pixel including the pixel electrode to which the data voltage is applied may be a pixel that includes the switching element that is turned-on according to the gate signal.

The data voltage applied through the plurality of data lines may be applied, through the turned-on switching element, to the pixel electrode of the pixel that includes the corresponding switching element. To this end, a third terminal of the switching element may be connected to the pixel electrode included in each pixel.

Liquid crystal molecules included in each pixel according to a difference in data voltage applied to the pixel electrode and common voltage applied to the common electrode may vary in their arrangement. Accordingly, a light transmittance of each pixel may be changed, and the display panel 110 may realize a grayscale in accordance with the change in light transmittance.

The processor 130 may control the overall operation of the display apparatus 100. The processor 130 may control hardware connected to the processor 130 or software elements by operating an operating system or an application program, and perform various data processing and calculations. In addition, the processor 130 may load a command or data received from at least one from among other elements to a volatile memory, process the loaded command or data and store various data in a non-volatile memory. The processor 130 may be, for example, a timing controller, but is not necessarily limited thereto.

The processor 130 may control the panel driver 120 (e.g., gate driver 121) to output the gate signal through the plurality of gate lines, and control the panel driver 120 (e.g., data driver 122) to apply, through the plurality of data lines, the data voltage to the plurality of pixels connected with the plurality of switching elements to which the gate signal is output.

Specifically, the processor 130 may generate the digital image signal that corresponds to each pixel of the display panel 110 by processing the digital image signal (or, image data) received externally. Then, the processor 130 may generate the gate driving control signal and the data driving control signal based on a horizontal synchronous signal, a vertical synchronous signal, and a clock signal received externally, transmit the gate driving control signal to the gate driver 121, and transmit the digital image signal and the data driving control signal to the data driver 122.

Here, the gate driving control signal may include the scan start signal which includes information on the start of the scan and the clock control signal which controls the output time of the gate signal. The gate driver 121 may output the gate signal at an appropriate timing according to the scan start signal and the clock control signal through the plurality of gate lines.

In this case, the plurality of switching elements connected with the gate line that outputs the gate signal may be turned-on.

The data driving control signal may include, for example, a horizontal synchronization start signal that includes information on a start of data transmission and a control signal that controls an application of data voltage through the plurality of data lines.

The data driver 122 may apply the data voltage to the plurality of pixels through the plurality of data lines at an appropriate timing according to the horizontal synchronization start signal and the control signal. Here, the pixel to which the data voltage is applied may be a pixel connected with the turned-on switching element as the gate signal is output.

The processor 130 may process image data received externally with a fast driving frequency.

Specifically, the processor 130 may process, based on the image ratio, image data at a second frequency which is higher than a preset first frequency in the display apparatus 100. Here, the first frequency may be 60 Hz, and the second frequency may be 120 Hz. However, the above is merely one embodiment, and the first frequency may be 120 Hz, and the second frequency may be 240 Hz, or the first and second frequencies may vary according to the embodiment.

To this end, the processor 130 may determine, based on the user input for selecting the image ratio being received, an image ratio selected according to the user input. Here, the image ratio may be an aspect ratio of a display area for displaying an image (or, content) from among a whole area of the display. Then, the processor 130 may generate the scan start signal which includes information on the start of the scan as described above based on the image ratio selected according to the user input. Specifically, the processor 130 may determine the some pixels for displaying an image from among the plurality of pixels that configure the display panel 110 based on the image ratio selected according to the user input, and generate the scan start signal for outputting the gate signal to the at least one gate line connected with the some pixels for displaying the image.

In an example, the gate line is configured of first to nth gate lines, and if a user input selecting display of an image through a full screen is received (that is, a user input selecting a ratio corresponding to a full screen display, which may be termed a "full-screen ratio"), the processor 130 may transmit the scan start signal for outputting the gate signal sequentially from the first gate line to the nth gate line to the gate driver 121. In this case, the gate driver 121 may output the gate signal sequentially from the first gate line to the nth gate line according to the scan start signal, and the switching element may be turned-on by the gate signal that is output through the gate line. Then, the plurality of data lines connected to the data driver 122 may be electrically connected with the plurality of turned-on switches, and the data driver 122 may apply (or, charge) the data voltage to the pixel electrode (e.g., capacitor) included in each pixel through the plurality of data lines based on the timing at which the gate signal is output.

If a user input selecting display of the image through a part of the screen is received (that is, a user input selecting a ratio corresponding to a partial screen display, which may be termed a "partial-screen ratio"), the processor 130 may transmit the scan start signal for outputting the gate signal through the gate line connected with the some pixels for displaying the image according to the user input from among the plurality of pixels to the gate driver 121.

In an example, if the aspect ratio of the display is 16:9, and the image ratio selected according to the user input is 32:9 or 21:9, the processor 130 may determine the some pixels for displaying the image based on the image ratio selected according to the user input from among the plurality of pixels. Then, the processor 130 may transmit the scan start signal for outputting the gate signal through some gate lines connected with pixels for displaying the image from among the plurality of gate lines to the gate driver 121. For example, the processor 130 may transmit, based on the gate lines connected with the plurality of pixels for displaying the image from among the first to nth gate lines being determined as xth to yth gate lines, the scan start signal for outputting the gate signal to the xth to yth gate lines to the gate driver 121. In this case, the gate driver 121 may output the gate signal sequentially from the xth gate line to the yth gate line according to the scan start signal, and the switching element connected with the xth to yth gate lines may be turned-on by the gate signal that is output through the gate line. Then, the plurality of data lines connected to the data driver 122 may be electrically connected with the plurality of turned-on switches, and the data driver 122 may apply (or, charge) the data voltage to the pixel electrode (e.g., capacitor) included in each pixel through the plurality of data lines based on the timing at which the gate signal is output.

As described above, the gate driver 121 may selectively output the gate signal through the some gate lines connected with pixels for displaying the image based on the scan start signal, and not output the gate signal through the remaining gate lines. Accordingly, the disclosure describes of display panel 110 being driven at a fast frequency which is compensated for the time the gate signal is not transmitted.

The plurality of gate lines according to an embodiment of the disclosure may be connected with the plurality of driving circuits. Here, the driving circuit may be, for example, a start of vertical (STV) circuit for receiving the scan start signal. Then, each driving circuit may be connected with at least one corresponding gate line, for example, five gate lines. In an example, a first driving circuit may be connected with first to fifth gate lines, and a second driving circuit may be connected with sixth to tenth gate lines, and similarly to the above, a nth driving circuit may be connected with five gate lines. The driving circuit that connects with the five gate lines may be one embodiment, and the number of gate lines connected with the driving circuit may vary according to the embodiment.

Then, the processor 130 may transmit, based on the user input for displaying the image through a full screen being received, the scan start signal for sequentially outputting the gate signal from the first gate line to the nth gate line to the plurality of driving circuits. In this case, the first driving circuit connected with the first to fifth gate lines may, for example, sequentially output the gate signal through the first to fifth gate lines according to receiving a first scan signal, the second driving circuit connected with the sixth to tenth gate lines may sequentially output the gate signal through the sixth to tenth gate lines according to receiving a second scan start signal, and similarly to the above, the nth driving circuit may sequentially output the gate signal through the plurality of gate lines connected with the nth driving circuit according to receiving a nth scan start signal. Then, the plurality of switching elements may be turned-on by the gate signal that is output through the gate line, and the plurality of data lines connected to the data driver 122 may be electrically connected with the plurality of turned-on switches. Then, the data driver 122 may apply (or, charge) the data voltage to the pixel electrode (e.g., capacitor) included in each pixel through the plurality of data lines based on the timing at which the gate signal is output.

If the user input for displaying an image through a part of the screen is received, the processor 130 may determine the some pixels for displaying the image according to the user input from among the plurality of pixels. Then, the processor 130 may determine the driving circuit connected with the gate line that can transmit the gate signal to the some pixels for displaying the image according to the user input from among the plurality of driving circuits, and transmit the scan start signal for outputting the gate signal to the corresponding driving circuit.

In an example, if the aspect ratio of the display is 16:9, and the image ratio selected according to the user input is 32:9, the processor 130 may determine the some pixels for displaying the image according to the image ratio selected according to the user input from among the plurality of pixels.

Then, the processor 130 may transmit, based on the gate line connected with the some pixels for displaying the image from among the first to nth gate lines being x1th to x3th gate lines and y1th to y3th gate lines, and the x1th to x3th gate lines being connected with the first driving circuit and the y1th to y3th gate lines being connected with the second driving circuit, the scan start signal for outputting the gate signal to the first and second driving circuits from among the plurality of driving circuits. In this case, the first driving circuit may sequentially output the gate signal from the x1th gate line to x3th gate line according to the first scan start signal, and the second driving circuit may sequentially output the gate signal from the y1th gate line to the y3th gate line according to the second scan start signal. Accordingly, the plurality of switching elements connected with the x1th to x3th gate lines and the y1th to y3th gate lines may be turned-on by the gate signal that is output through the gate line, and the plurality of data lines connected to the data driver 122 may be electrically connected with the plurality of turned-on switches. Then, the data driver 122 may apply (or, charge) the data voltage to the pixel electrode (e.g., capacitor) included in each pixel along the plurality of data lines based on the timing at which the gate signal is output. In this example, the first and second driving circuits may be termed a first circuit subset corresponding to the first gate line subset, and the remaining driving circuits which do not receive the scan start signal may be termed a second circuit subset corresponding to the second gate line sub set.

The processor 130 may receive a user input for an up-down move of an image; that is, an input for a movement of the displayed image up or down on the screen to be displayed on a different portion thereof. This input may be termed a movement user input. In this case, the processor 130 may generate the scan start signal based on the user input for the up-down move of the image. Specifically, the processor 130 may determine (or re-determine) the some pixels for displaying the image based on the user input for moving the screen up and down from among the plurality of pixels included in the display panel 110. Then, the processor 130 may generate the scan start signal for transmitting the gate signal to the determined some pixels based on the user input for the up-down move of the image, and transmit the scan start signal to the gate driver 121. In this case, the gate driver 121 may selectively output the gate signal through the some gate lines connected with the some pixels for displaying an image based on the scan start signal, and not output the gate signal through the remaining gate lines. As described above, the disclosure describes of not transmitting, based on the user input for the up-down move of the image, the gate signal through the remaining gate lines excluding the some gate lines, and thereby, the display panel 110 may be driven at a fast frequency which is compensated for the time the gate signal is not transmitted.

Figure 3:
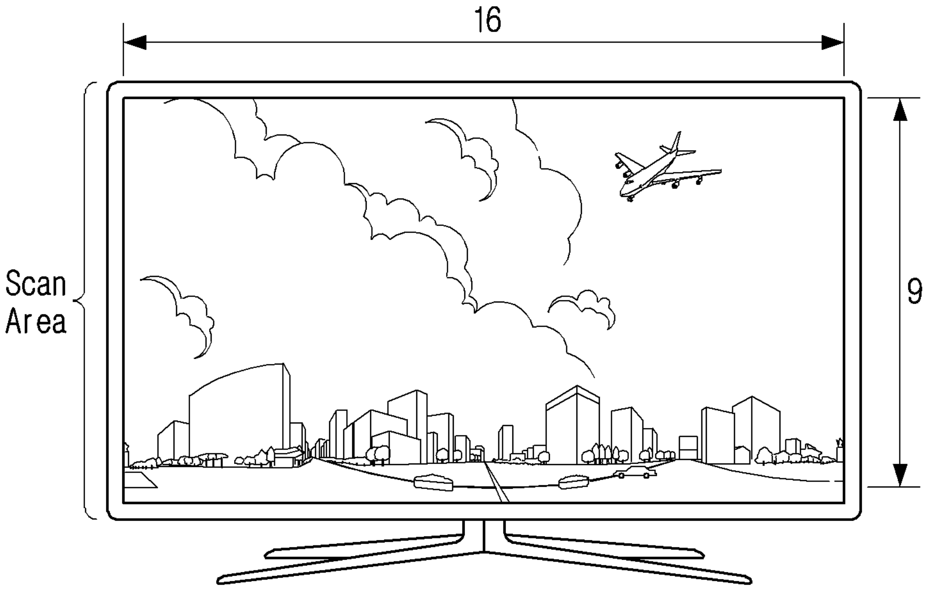
FIG. 3 is a diagram illustrating a scan area for when an image is displayed whole screen according to an embodiment of the disclosure.
Figure 4:
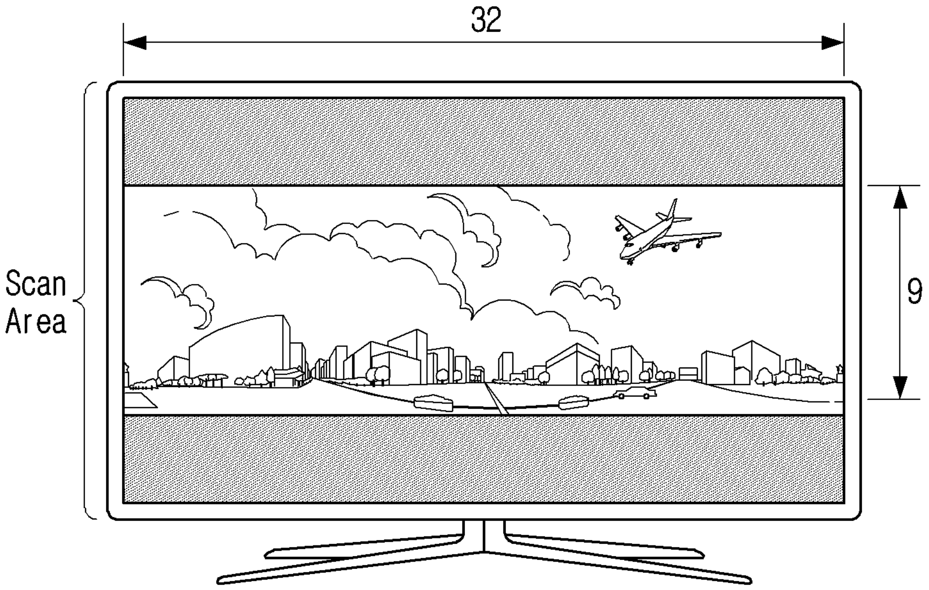
FIG. 4 is a diagram illustrating a scan area for when an image is displayed at a part of a screen according to an embodiment of the disclosure.

FIG. 3 is a diagram illustrating a scan area of when an image is displayed in a full screen according to an embodiment of the disclosure, and FIG. 4 is a diagram illustrating a scan area of when an image is displayed on a part of a screen according to an embodiment of the disclosure.

As described in the above, the processor 130 may determine a gate scan start position based on the user input for selecting the image ratio and/or the user input for the up-down move of the image. Here, the gate scan start position may be a position of the gate line that initially outputs the gate signal according to the scan start signal from among the plurality of gate lines.

In an example, if the gate line is configured of the first to nth gate lines, the gate scan start position in case the image is displayed through a full screen may be the first gate line, and the scan area (or, a gate scan area) may be an area that includes the first to nth gate lines as shown in FIG. 3. Here, the scan area may be an area that includes the gate line that outputs the gate signal.

The processor 130 may determine, based on pixels for displaying an image being determined as the plurality of pixels connected with the xth to yth gate lines from among the plurality of pixels connected with the first to nth gate lines based on the user input for selecting the image ratio and/or the user input for the up-down move of the image, the xth gate line as the gate scan start position, and transmit the scan start signal for outputting the gate signal from the xth gate line to the yth gate line to the gate driver 121.

In this case, the scan area may be an area that includes the xth to yth gate lines and not the whole of the first to nth gate lines as shown in FIG. 4.

Accordingly, if a display driving frequency for displaying the image through a full screen as in FIG. 3 is 120 Hz (this may be a frequency preset in the display apparatus 100), the display driving frequency for displaying an image through a 32:9 ratio as in FIG. 4 may be 240 Hz, and the disclosure describes of seamlessly playing back a high frame rate image through a fast driving frequency.

The processor 130 may control the panel driver 120 to output, at a preset period, the gate signal to at least one gate line connected with the remaining pixels excluding the plurality of pixels for displaying the image. Then, the processor 130 may control, based on the timing at which the gate signal is output, the panel driver 120 to apply data voltage for displaying an image of a substantially black color to the plurality of pixels connected with the gate line to which the gate signal is output. Here, the preset period may be, in an example, 3 seconds, but is not necessarily limited thereto. This is to prevent a problem of light being emitted because the data line is connected with the pixel for displaying an image passing the pixels (e.g., pixels positioned at a black area excluding the image in FIG. 4) that do not display the image, and accordingly, light being emitted because a portion of data voltage is applied even to pixels that do not display the image in the operation of applying the data voltage to the plurality of pixels for displaying the image.

Figure 5:
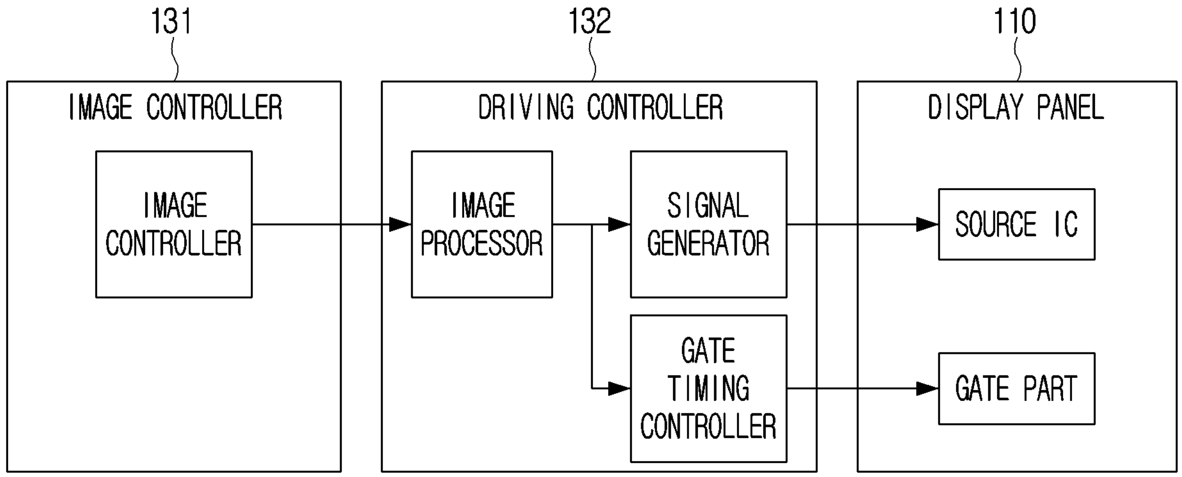
FIG. 5 is a block diagram illustrating a display apparatus according to an embodiment of the disclosure.

FIG. 5 is a block diagram illustrating a display apparatus according to an embodiment of the disclosure.

In FIG. 2, the display panel 110 and the panel driver 120 have been shown separately for convenience of description, but the panel driver 120 may instead be included in the display panel 110 as shown in FIG. 5.

In addition, the processor 130 may be implemented either as a single processor, as shown in FIGS. 1 and 2, or as a separate image controller 131 and driving controller 132, as shown in FIG. 5.

The image controller 131 may receive image data externally, and control the driving controller 132 to process the image data based on a type of image data, a frame rate of the image data, or a number of frames per second of the image data. In addition, as described above, the image controller 131 may control the driving controller 132 to process the image data based on the user input for selecting the image ratio and/or the user input for the up-down move of the image.

The driving controller 132 may process the image data at a standard driving frequency or a fast driving frequency according to the control of the image controller 131. Here, the standard driving frequency may be a frequency of the display apparatus 100 of when displaying an image through a full screen, and may, for example, be 120 Hz, and the fast driving frequency may be a frequency of the display apparatus 100 of when displaying an image through a part of the screen, and may, for example, be 144 Hz, 240 Hz, or the like.

When displaying an image through the full screen of the display apparatus 100, a signal generator of the driving controller 132 may generate, based on the image data, an image signal corresponding to the plurality of pixels of a plurality of horizontal lines and transmit the image signal to a source IC (may be the above-described data driver) of the display panel 110. Then, a gate timing controller of the driving controller 132 may transmit a signal for outputting the gate signal through the plurality of gate lines to a gate unit (may be the above-described gate driver) of the display panel 110. In this case, the display panel 110 may display the image through the whole screen of the display according to an output of the gate signals and an application of the data voltage.

When displaying an image through the part of the screen of the display apparatus 100, the signal generator of the driving controller 132 may generate, based on the image data, an image signal corresponding to the plurality of pixels of some horizontal lines for displaying the image from among the plurality of pixels of the plurality of horizontal lines and transmit the image signal to the source IC of the display panel 110. Then, the gate timing controller of the driving controller 132 may transmit a signal for outputting the gate signal to the gate unit of the display panel 110 through some gate lines from among the plurality of gate lines. In this case, the display panel 110 may display the image through a part of the screen of the display according to the output of the gate signals and the application of the data voltage.

Figure 6:
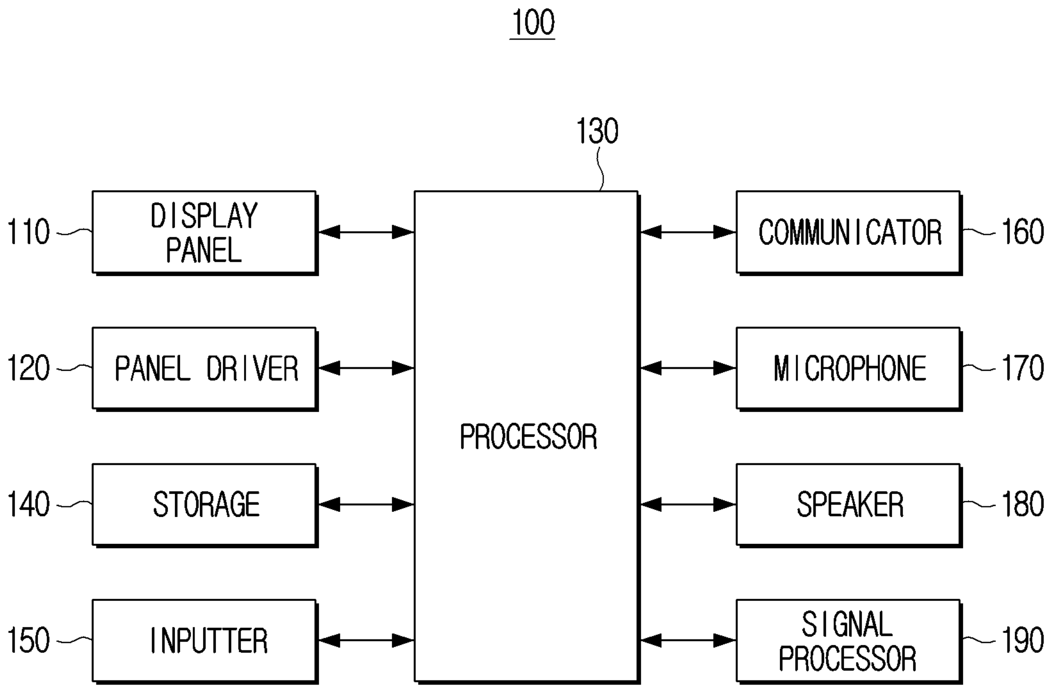
FIG. 6 is a detailed block diagram illustrating a display apparatus according to an embodiment of the disclosure.

FIG. 6 is a detailed block diagram illustrating a display apparatus according to an embodiment of the disclosure.

Referring to FIG. 6, the display apparatus 100 according to an embodiment of the disclosure may include the display panel 110, the panel driver 120, a storage 140, an inputter 150, a communicator 160, a microphone 170, a speaker 180, a signal processor 190, and the processor 130. Parts that overlap with the above-described descriptions will be omitted below.

The storage 140 may store an operating system (OS) for controlling the overall operation of the elements of the display apparatus 100 and commands or data associated with the elements of the display apparatus 100.

Accordingly, the processor 130 may control a plurality of hardware or software elements of the display apparatus 100 using various commands or data stored in the storage 140, load the commands or data received from at least one from among other elements in the volatile memory and process the received commands or data, and store the various data in the non-volatile memory.

The inputter 150 may receive various user input. The processor 130 may execute a function corresponding to the user input which is input through the inputter 150.

For example, the inputter 150 may receive the user input for a mode setting of the display apparatus 100. Here, the user input for the mode setting may be the user input for selecting the image ratio and/or the user input for the up-down move of the image. In addition, the inputter 150 may receive the user input for performing a turn-on, a channel change, a volume adjustment, and the like, and the processor 130 may perform the changing of the image ratio and/or the moving of the image up and down according to the user input, or perform the turning-on, the changing the channel, the adjusting the volume, the turning-off, and the like of the display apparatus 100.

To this end, the inputter 150 may be implemented as an input panel. The input panel may be implemented in a touch pad, a key pad that includes various function keys, number keys, special keys, character keys, and the like, or in a touch screen method. Alternatively, the inputter 150 may be implemented as the communicator 160, and may receive a signal corresponding to the user input which is input to an external device from an external device (e.g., remote controller, smart phone, etc.).

The communicator 160 may transmit and receive various data by communicating with an external device. For example, the communicator 160 may perform communication with an electronic device through a network such as a local area network (LAN), an internet network, or a mobile communication network, or through various communication methods such as, for example, and without limitation, Bluetooth (BT), Bluetooth Low Energy (BLE), Wireless Fidelity (Wi-Fi), ZigBee, NFC, and the like.

To this end, the communicator 160 may include various communication modules for performing network communication. For example, the communicator 160 may include a Bluetooth chip, a Wi-Fi chip, a wireless communication chip, and the like.

Specifically, the communicator 160 may perform communication with an external device and receive image data from the external device. Here, the external device may be a server, a smart phone, a computer, a notebook computer, and the like, but is not necessarily limited thereto. In addition, the communicator 160 may receive a signal corresponding to the user input which is input to the external device. Here, the user input may be the user input for selecting the image ratio and/or the user input for the up-down move of the image described above.

The microphone 170 may receive a user voice. Here, the user voice may be a voice for executing a specific function of the display apparatus 100. In an example, the user voice may be a user voice for the user input to select the image ratio and/or for the up-down move of the image. The processor 130 may analyze, based on the user voice being received through the microphone 170, the user voice through a speech to text (STT) algorithm, and perform a function corresponding to the user voice.

In an example, the processor 130 may operate, based on the user voice for setting the mode of the display apparatus 100 being received through the microphone 170, in a first mode according to the user voice, and display the image data processed at the standard driving frequency in the whole area of the display, or operate in a second mode and display the image data processed at the fast driving frequency to a part of the area of the display.

The speaker 180 may output various sounds. For example, the speaker 180 may output a sound corresponding to the image data.

The signal processor 190 may perform signal processing of the image data received through the communicator 160. Specifically, the signal processor 190 may perform operations such as decoding, scaling, frame rate conversions, and the like of an image that configure the image data, and signal process the image data to a form outputtable from the display apparatus 100. In addition, the signal processor 190 may perform signal processing such as decoding of an audio signal, and the like, and signal process the audio signal to an form outputtable from the speaker 180.

Figure 7:
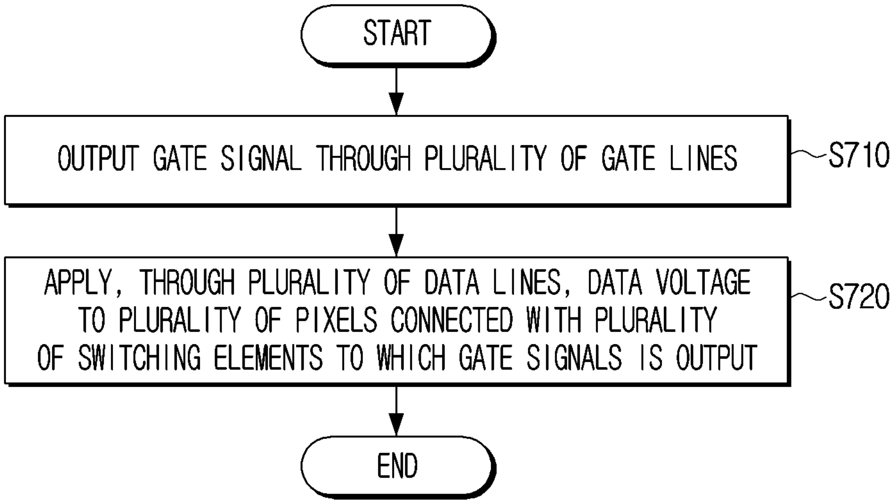
FIG. 7 is a flowchart illustrating a control method of a display apparatus according to an embodiment of the disclosure.

FIG. 7 is a flowchart illustrating a control method of a display apparatus according to an embodiment of the disclosure.

The display apparatus 100 may output the gate signal through the plurality of gate lines (S710).

In an example, the display apparatus 100 may selectively output, based on the user input for selecting the image ratio, the gate signal to at least one gate line connected with the some pixels for displaying the image according to the user input from among the plurality of pixels; that is, to at least one first gate line connected with the first pixel subset. Here, the user input may be a user input for displaying the image at a part of the area and not the whole area of the display.

In this case, the display apparatus 100 may selectively not output the gate signal to the at least one gate line which is connected with remaining pixels excluding the some pixels for displaying the image according to the user input from among the plurality of pixels.

The display apparatus 100 may include the plurality of driving circuits connected with the at least one gate line from among the plurality of gate lines, and output, based on the user input for selecting the image ratio, the gate signal to the at least one gate line which is connected with the plurality of pixels for displaying the image through some driving circuits from among the plurality of driving circuits.

Specifically, the display apparatus 100 may transmit the scan start signal for driving the some driving circuits and a low signal for not driving the remaining driving circuits excluding the some driving circuits to the panel driver 120. Then, the panel driver 120 may selectively output the gate signal to the at least one gate line connected with the plurality of pixels for displaying the image through the some driving circuits from among the plurality of driving circuits according to the scan start signal, and may selectively not output the gate signal to the gate line connected with the remaining driving circuits according to the low signal.

Then, the display apparatus 100 may apply, through the plurality of data lines, data voltage to the plurality of pixels connected with the plurality of switching elements to which the gate signal is output (S720).

In an example, if the gate signal is output through the some gate lines based on the user input for selecting the image ratio, the display apparatus 100 may apply, based on the output timing of the gate signal, the data voltage to the plurality of pixels connected with the gate lines to which the gate signal is output.

The methods according to the various embodiments of the disclosure described above may be implemented in a software or an application form installable in the display apparatus of the related art.

In addition, the methods according to the various embodiments of the disclosure described above may be implemented with only a software upgrade or a hardware upgrade for display apparatus of the related art.

In addition, the various embodiments of the disclosure described above may be implemented through an embedded server provide in the display apparatus or through a server outside the display apparatus.

A non-transitory computer readable medium stored with a program that sequentially performs the control method of the display apparatus according to the disclosure may be provided.

The non-transitory computer readable medium may be a medium that stores data semi-permanently rather than storing data for a very short time, such as a register, a cache, a memory, or the like, and is readable by a device. Specifically, the above-described various applications and programs may be stored in the non-transitory computer readable medium such as, for example, and without limitation, a compact disc (CD), a digital versatile disc (DVD), a hard disc, a Blu-ray disc, a USB, a memory card, a ROM, and the like, and provided.

While the disclosure has been illustrated and described with reference to various example embodiments thereof, it will be understood that the various example embodiments are intended to be illustrative rather than limiting. It will be understood by those skilled in the art that various changes in form and details may be made therein without departing from the true spirit and full scope of the disclosure, including the appended claims and their equivalents.

What is claimed is:

1. A display apparatus comprising:

an inputter;

a panel driver;

a display panel comprising a plurality of pixels connected to a plurality of gate lines and a plurality of data lines through a plurality of switching elements; and a processor configured to control the panel driver to:

output a gate signal through the plurality of gate lines, and display an image in the display panel at a first frequency by controlling the panel driver to apply, through the plurality of data lines, data voltage to pixels, from among the plurality of pixels, connected with switching elements, from among the plurality of switching elements, to which the gate signal is output, wherein the processor is further configured to control, based on a user input for selecting a ratio of the image being received through the inputter, the panel driver to output the gate signal to first gate lines connected with a first subset of pixels, from among the plurality of pixels, for displaying the image at a second frequency according to the selected ratio of the image, to not output the gate signal to second gate lines connected with a second subset of pixels from among the plurality of pixels excluding the first subset of pixels, the second frequency being higher than the first frequency.

2. The display apparatus of claim 1, wherein the panel driver comprises a plurality of driving circuits, each of the plurality of driving circuits being connected with gate lines from among the plurality of gate lines, and configured to output, based on the user input, the gate signal to the gate lines through a first subset of circuits from among the plurality of driving circuits.

3. The display apparatus of claim 2, wherein the processor is further configured to transmit a scan start signal for driving the first subset of circuits and a low signal for not driving a second subset of circuits from among the plurality of driving circuits, excluding the first subset of circuits, to the panel driver.

4. The display apparatus of claim 1, wherein the panel driver is further configured to apply, based on an output timing of the gate signal, data voltage to each pixel connected to each gate line of the first gate lines to which the gate signal is output.

5. The display apparatus of claim 1, wherein the processor is further configured to:

control, based on the user input selecting a full-screen ratio, the panel driver to output the gate signal through the plurality of gate lines, and control, based on the user input selecting a partial-screen ratio, the panel driver to output the gate signal through the first gate lines.

6. The display apparatus of claim 1, wherein the processor is further configured to:

control the panel driver to output the gate signal to the second gate lines connected with the second subset of pixels from among the plurality of pixels, excluding the first subset of pixels, at a preset period, and control, based on a timing at which the gate signal is output at the preset period, the panel driver to apply data voltage for displaying an image of a substantially black color to the second subset of pixels.

7. The display apparatus of claim 1, wherein the processor is further configured to determine, based on a user input for controlling a movement of the image, the first subset of pixels and the first gate lines.

8. A control method of a display apparatus, the control method comprising:

outputting a gate signal through a plurality of gate lines of the display apparatus; and displaying an image by the display apparatus at a first frequency by applying, through a plurality of data lines, data voltage to pixels, from among a plurality of pixels of the display apparatus, connected with switching elements, from among a plurality of switching elements of the display apparatus, to which the gate signal is output, wherein the control method further comprises:

outputting, based on a user input for selecting a ratio of the image being received through an inputter of the display apparatus, the gate signal to first gate lines connected with a first subset of pixels from among the plurality of pixels for displaying the image at a second frequency according to the selected ratio of the image, the second frequency being higher than the first frequency, and wherein the gate signal is not outputted to second gate lines connected with a second subset of pixels from among the plurality of pixels excluding the first subset of pixels.

9. The control method of claim 8, wherein the outputting the gate signal to the first gate lines comprises outputting, based on the user input, the gate signal to the first gate lines through a first subset of circuits from among a plurality of driving circuits.

10. The control method of claim 9, wherein the outputting the gate signal to the first gate lines comprises outputting, based on a scan start signal for driving the first subset of circuits and a low signal for not driving a second subset of circuits from among the plurality of driving circuits, excluding the first subset of circuits, the gate signal, to the first gate lines.

11. The control method of claim 8, wherein the applying the data voltage comprises applying, based on an output timing of the gate signal, data voltage to each pixel connected with each gate line of the first gate lines to which the gate signal is output.

12. The control method of claim 8, wherein based on the user input for selecting a full-screen ratio being received through the inputter of the display apparatus, the gate signal is outputted through each of the plurality of gate lines, and based on the user input for selecting a partial-screen ratio being received through the inputter of the display apparatus, the gate signal is selectively outputted to the first gate lines.

13. The control method of claim 8, further comprising:

outputting the gate signal to the second gate lines connected with the second subset of pixels from among the plurality of pixels excluding the first subset of pixels at a preset period; and applying, based on a timing at which the gate signal is output at the preset period, data voltage for displaying an image of a substantially black color to the second subset of pixels.

14. The control method of claim 8, further comprising:

determining, based on a movement user input for controlling a movement of the image, the first subset of pixels and the first gate lines.

* * * * *